United States Patent
Xu et al.

(10) Patent No.: US 6,819,574 B2
(45) Date of Patent: Nov. 16, 2004

(54) SELF-DRIVEN CIRCUIT FOR SYNCHRONOUS RECTIFIER DC/DC CONVERTER

(75) Inventors: Ming Xu, Blacksburg, VA (US); Fred C. Lee, Blacksburg, VA (US); Yuancheng Ren, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 14 days.

(21) Appl. No.: 10/350,330

(22) Filed: Jan. 24, 2003

(65) Prior Publication Data

US 2004/0145920 A1 Jul. 29, 2004

(51) Int. Cl.[7] .............................................. H02M 3/335
(52) U.S. Cl. .................................. 363/21.04; 363/21.07
(58) Field of Search ............................ 363/15–17, 21.04, 363/21.06, 21.07, 24, 25, 39, 59, 123, 125, 131–134

(56) References Cited

U.S. PATENT DOCUMENTS

| | | | | |
|---|---|---|---|---|
| 4,399,499 A | * | 8/1983 | Butcher et al. | 363/17 |
| 4,449,175 A | * | 5/1984 | Ishii et al. | 363/17 |
| 5,590,032 A | * | 12/1996 | Bowman et al. | 363/15 |
| 6,091,616 A | * | 7/2000 | Jacobs et al. | 363/127 |
| 6,188,592 B1 | * | 2/2001 | Farrington et al. | 363/98 |
| 6,297,970 B2 | * | 10/2001 | Hemena et al. | 363/21.06 |
| 6,473,317 B1 | * | 10/2002 | Simopoulos | 363/21.06 |

OTHER PUBLICATIONS

A New Driving Scheme for Synchronous Rectifiers: Single Winding Self–Driven Synchronous Rectification, P. Alou, Jose A. Cobos, Oscar Garcia, Roberto Prieto, Javier Uceda; IEEE Transactions on Power Electronics, vol., 16 No.6 Nov. 2001; pp. 803–811.

* cited by examiner

*Primary Examiner*—Adolf Berhane
(74) *Attorney, Agent, or Firm*—Witham, Curtis & Christofferson, PC (57) ABSTRACT

A power converter having a primary circuit (e.g. full bridge) and a secondary circuit (e.g. current doubler) has switches in the secondary circuit that are controlled by a drive circuit. The drive circuit is connected to a swing node in the primary circuit, and is powered by the swing node. The drive circuit has an isolation device such as a transformer to provide electrical isolation between the primary circuit and secondary circuit. The drive circuit provides a current source for driving the secondary switch gates, thereby reducing power consumption. The present drive circuit provides clean gate drive signals without noise and oscillations. The drive circuits of the invention are simple, and require only a few components.

24 Claims, 6 Drawing Sheets

SELF-DRIVEN CIRCUIT FOR SYNCHRONOUS RECTIFIER DC/DC CONVERTER

FIELD OF THE INVENTION

The present invention relates generally to electrical power supplies. More particularly, it relates to switching power converters and a circuit for driving secondary-side switches with energy from the primary side.

BACKGROUND OF THE INVENTION

Synchronous rectifier DC/DC converters typically have a primary circuit and a secondary circuit coupled through a transformer. The secondary circuit has switches that rectify the power coupled through the transformer. Such power converters are commonly used to provide the low-voltage, high-current power required for operating microprocessors and the like from higher voltage power sources.

In recent years, successive generations of microprocessors have required power with decreased voltage, increased current, decreased ripple and increased current slew rate. For example, some microprocessors currently in development will require 100 Amps at 1 volt with less than 25 mV ripple. Additionally, circuitboard space is limited, and the high cost of large capacity filtering components (e.g. capacitors, inductors) must be avoided. In order to meet these requirements, power converters must operate at higher frequencies. However, higher frequency operation results in greatly reduced power efficiency. Specifically, increasing frequency results in higher switching losses (e.g. reverse recovery loss), higher gate driving losses and higher body diode conduction losses. To make high frequency operation possible, and hence provide power converters for future microprocessors, these losses must be reduced.

Several methods for reducing gate drive losses and for self-driving secondary gates are known in the art. For example, secondary switches can be self-driven by a cross coupled secondary circuit design. However, the cross-coupled secondary design does not function properly for very low output voltages because there is insufficient voltage to drive the switch gates.

Another known self-driving technique is described by Pedro Alou et al. in "A new self driving scheme for synchronous rectifiers: single winding self-driven synchronous rectification", published in IEEE Transactions On Power Electronics, Vol. 16, No. 6, November 2001. In this technique, secondary side switches are driven by a circuit powered from an additional winding on the main transformer. A problem with this technique is ringing in the gate drive signal, which tends to turn off the secondary switches at inappropriate times. Also, it requires an additional winding on the transformer, which complicates the transformer design. Further, it tends to result in increased body diode conduction loss.

It would be an advance in the art of electrical power conversion to be able to reduce gate drive losses such that higher frequency operation of power converters is practical. It would be particularly advantageous to reduce gate drive losses using a self-drive scheme that does not produce ringing and unwanted noise in the secondary circuit, and provides reduced body diode conduction loss.

SUMMARY

The present invention includes a power converter with a primary circuit, a secondary circuit, and a driver for driving switches in the secondary circuit. The driver is connected to, and obtains power from, a swing node in the primary circuit. The driver circuit includes an isolation device (e.g. drive transformer, piezotransformer, optoisolator) so that the primary circuit and secondary circuit are electrically isolated.

The primary circuit can be a full bridge circuit, an active clamp forward circuit, or an asymmetrical half bridge circuit, for example. The secondary circuit can be a half-wave circuit, a center-tapped circuit, or a current-doubler circuit, for example.

The driver circuit can have a damping resistor for preventing voltage oscillations at a gate of the secondary side switch. The damping resistor preferably has a small resistance, for example, less than 5 Ohms, or 1 Ohm. If a drive transformer is used, it preferably has a small leakage inductance, for example, less than 10 or 5 nanohenries.

The driver circuit can control two secondary side switches.

DETAILED DESCRIPTION OF THE INVENTION

The present invention provides a circuit for self driving secondary switches in a synchronous rectifier power converter. In the present invention, power for driving the secondary-side switch gates is derived from swing nodes in the primary side circuit. Swing nodes are defined as points in the primary side circuit that oscillate widely in voltage. Typically, the swing nodes are points in the primary side circuit where two switches are connected. Power from the swing nodes is coupled through a drive transformer (or other isolation device such as a piezotransformer or optoisolator) to the secondary side switch gates. Capacitors, diodes and resistors can be connected to the drive transformer to condition the gate drive energy (e.g. prevent ringing and oscillations and provide negative voltage clamping). The present invention can be used in combination with many kinds of primary circuits and secondary circuits, in any combination. For example, the present invention can be used with full bridge, active clamp forward, and asymmetric half-bridge type primary circuits, and can be used with half-wave, center-tapped, and current-doubler type secondary circuits. The present invention can reduce gate drive losses by about 50% during high frequency operation (e.g. above 500 kHz) compared to prior art self-drivers for secondary circuits. Also, the present invention provides clean gate drive signals, without problematic noise or oscillations.

Figure 1:
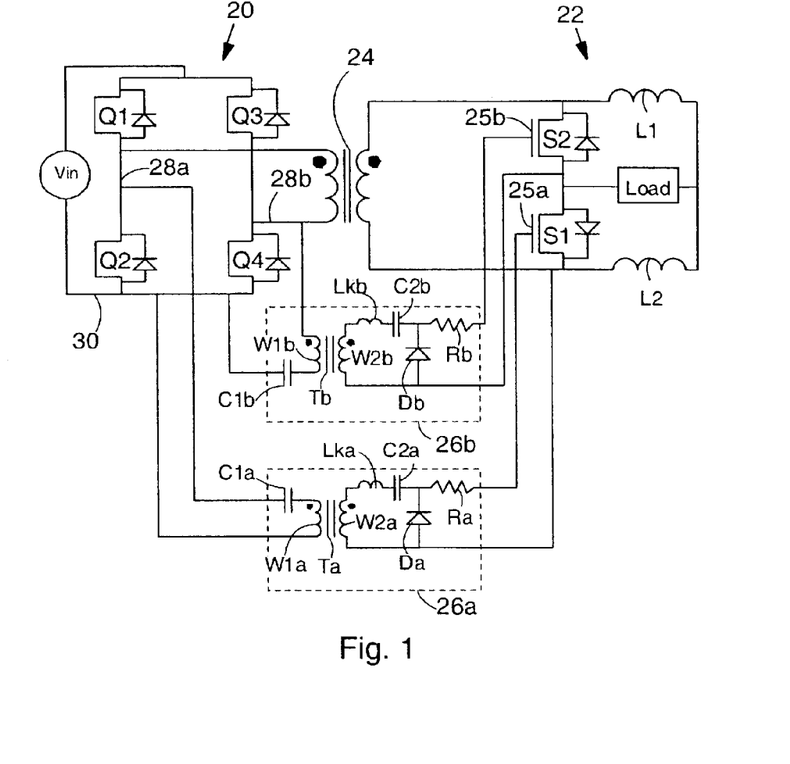
FIG. 1 shows a full bridge current doubler power converter according to the present invention.

FIG. 1 shows a power converter according to one embodiment of the present invention. The power converter has a full bridge circuit 20 (comprising Q1–Q4) and a current doubler circuit 22 (comprising S1, S2, L1, and L2) coupled with a transformer 24, as known in the art. A power source Vin provides power to the full bridge circuit 20. Driver circuits 26a 26b are connected to the full bridge circuit 20 and to the current doubler circuit 22. In the present invention, control gates 25a 25b of switches S1 and S2 are controlled by the driver circuits 26a 26b, respectively. Switches Q1–Q4 are controlled by another driver circuit which is not shown, but is well known in the art. The full bridge circuit 20 is a specific kind of primary circuit that can be used in the invention; the current doubler circuit is a specific kind of secondary circuit that can be used in the invention. The full bridge primary circuit 20 of FIG. 1 has two legs, but the present invention can also be used with full bridge circuits having 3, 4 or any number of legs.

Driver circuits 26a 26b are powered by connection to swing nodes 28a 28b of the full bridge circuit 20. Driver circuit 26a is connected across switch Q2 and driver circuit 26b is connected across switch Q4. Driver circuits 26a 26b are also connected to ground 30 of the full bridge circuit 20. Each driver circuit has a drive transformer Ta Tb, and each drive transformer has a primary winding W1a W1b, and a secondary winding W2a W2b. A primary capacitor C1a C1b is connected in series with each primary winding W1a W1b. Each drive transformer Ta Tb has associated leakage inductance Lka Lkb. The drive transformers Ta Tb provide electrical isolation between the full bridge circuit 20 and current doubler circuit 22. Each drive circuit also has a secondary capacitor C2a C2b, a damping resistor Ra Rb, and a clamping diode Da Db connected as shown. The driver circuits 26a 26b of the present invention control the secondary switches S1 S2 in response to operation of the full bridge switches Q1–Q4.

Swing nodes 28a 28b are defined in the invention as points in a primary circuit that oscillate in voltage according to a pattern that is the same as a switching pattern of switches in a secondary circuit, and as points in the primary circuit where two primary power switches are directly connected.

Figure 2:
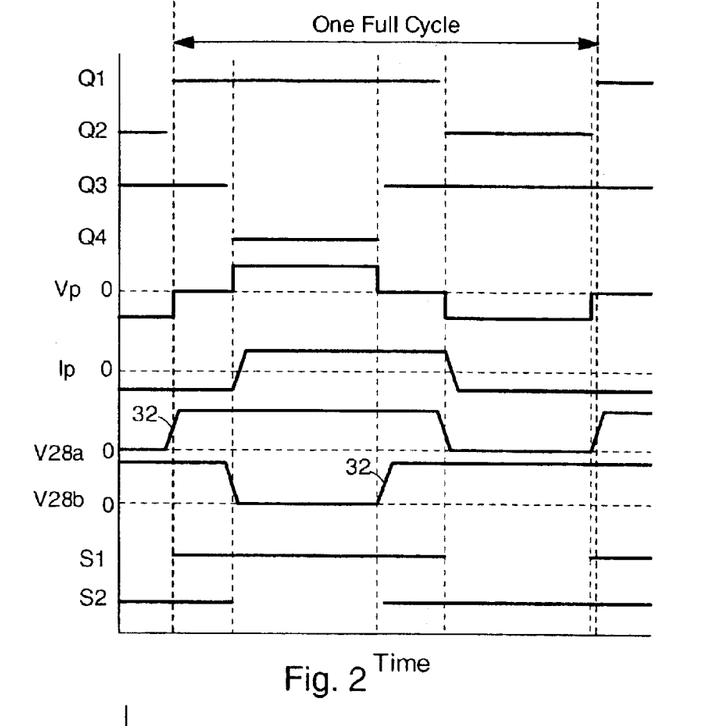
FIG. 2 shows a switching scheme for operating the power conversion circuit of FIG. 1.

FIG. 2 shows a complimentary control switching scheme for operating the power converter of FIG. 1. Horizontal lines indicate when switches Q1–Q4 and S1–S2 are ON. Vp is the voltage across primary winding of transformer 24. Ip is the current through primary winding of transformer 24. V28a is the voltage at swing node 28a; V28b is the voltage at swing node 28b. From FIG. 2 it is apparent that switches S1 and S2 are ON when switches Q2 and Q4 are OFF, respectively. This is because rising voltage 32 at the swing nodes 28a 28b increases voltage at gates 25a 25b, respectively, and thereby turns ON switches S1 and S2, respectively.

Drive transformers Ta Tb can have a 1:1 turns ratio or any other turns ratio that provides a desired voltage level for driving gates 25a 25b. For example, if the power source Vin provides relatively high voltage, then the drive transformers Ta Tb can have a turns ratio of less than 1 so that gates of S1 and S2 receive reduced voltage.

It is noted that the polarity of the drive transformers Ta Tb may be dependent on the control scheme. For example, the polarity of the drive transformers Ta Tb in FIG. 1 is appropriate for use with the complementary control scheme illustrated in FIG. 2 other control schemes may require drive transformers with different polarity.

Primary capacitors C1a C1b prevent saturation of the cores of the drive transformers Ta Tb (i.e. by providing voltage-second balance) and are necessary in the invention when drive transformers Ta Tb are used. The capacitance of capacitors C1a C1b partially depends on the power requirements of gates 25a 25b.

Clamping diodes Da Db prevent voltage reversals (i.e. negative voltages) from being applied to the gates 25a 25b. They are optional, but preferred in the present invention.

In operation, LC oscillations are produced between the leakage inductances Lka Lkb, secondary capacitors C2a C2b and the capacitance of the gates 25a 25b. Damping resistors Ra Rb are provided to dampen these LC oscillations. Specifically, damping resistors Ra Rb should have resistance values high enough so that switches S1 S2 are not repeatedly switched by the LC oscillations. That is, resistance values of Ra and Rb should be high enough so that switches S1 and S2 change state exactly once per transition.

The amplitude of the LC oscillations is roughly proportional to the value of the leakage inductances Lka Lkb and capacitances of the gates 25a 25b. Therefore, it is best to use drive transformers Ta Tb with leakage inductances that are as small as possible, and use switches with small gate capacitances. Low leakage inductance and small gate capacitance allows for smaller values of resistance for damping resistors Ra Rb. Low damping resistance has the great advantage of increasing the power efficiency of the driver circuits 26s 26b. It is noted that the damping resistor Ra Rb can be eliminated if the LC oscillations do not produce voltages that cause switching of the secondary switches S1 S2 (i.e. if the voltage troughs during LC oscillation do not go below the switching threshold of switches S1 S2).

Figure 3:
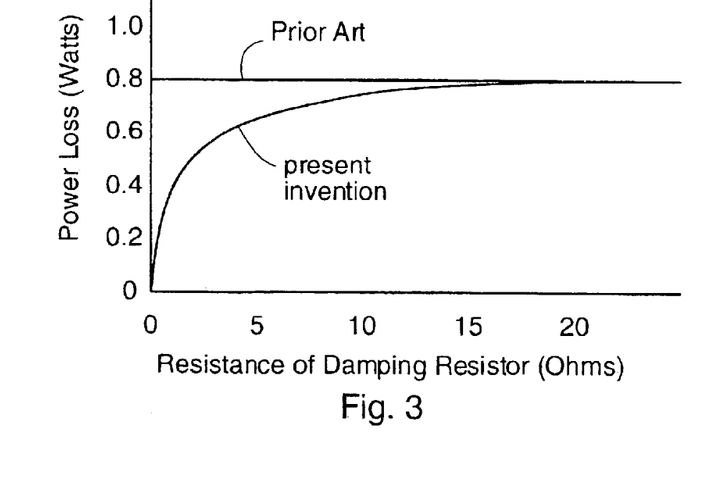
FIG. 3 shows a graph of gate drive power loss for a specific implementation of the present invention and for a conventional gate drive circuit according to the prior art.

FIG. 3 illustrates power loss of the driver circuits 26a 26b versus resistance of damping resistors Ra Rb for a specific case with Lk=4 nanoHenries (nH), S1, S2 gate capacitance of 8 nanoFarads (nF) and operation at 1 MHz. Also shown is the loss for a conventional gate driver circuit having a gate resistor in series with a switch gate. In the present invention, power loss is decreased, and efficiency increased, by reducing the resistance of the damping resistors as much as possible, while retaining enough damping resistance to inhibit LC oscillations. In the present invention, dissipated power is approximately proportional to the inverse of damping resistance. The power loss reduction in the present invention is a result of the fact that the drive transformers Ta Tb provide essentially a current source instead of a voltage source (as in the conventional art) to the gates 25a 25b. The present driver is a current source because the gate capacitances of S1 and S2 behave as snubber capacitors, as seen from the primary side through the drive transformers Ta Tb. By comparison, conventional gate drives provide a voltage source to drive the switch gates. As a result, changing resistance in series with the gate does not affect the amount of dissipated power in the conventional gate driver.

Hence, by selecting drive transformers Ta Tb with low leakage inductances (e.g. below 5 or 10 nH), and minimizing gate capacitance (e.g. below 5 or 10 nF), low damping resistances can be used, and efficiency can be greatly increased over the gate driver circuits of the prior art. Another advantage of having small leakage inductances Lka Lkb and small gate capacitances (of secondary side switches) is that it tends to reduce the dead time (i.e. time lag). A short dead time tends to reduce power loss (e.g. reduced body diode conduction) in the present power converter.

As a specific example, if the leakage inductance Lk is about 3–10 nH, and the gate capacitance of secondary switches S1 S2 is about 8 nF, then the damping resistor R can be about 0.5–1 Ohm.

Figure 4:
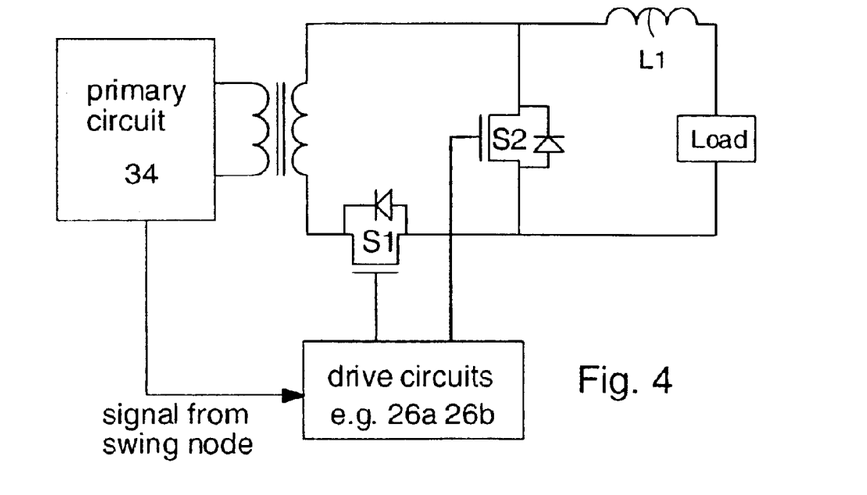
FIG. 4 shows a half-wave type secondary circuit that can be used with the driver circuits of the present invention.
Figure 5:
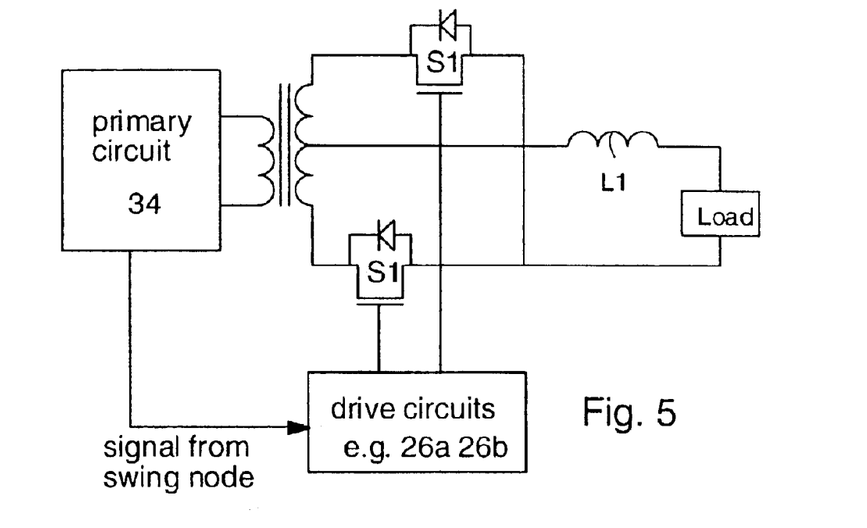
FIG. 5 shows a center-tapped type secondary circuit that can be used with the driver circuits of the present invention.

The present invention can be used with many different kinds of secondary circuits. For example, FIG. 4 shows a half-wave secondary circuit that can be used with the driver circuits of the present invention. The switches S1 S2 are connected to drive circuits 26a 26b. A primary circuit 34 can be a full bridge circuit 20 or other kind of primary circuit. FIG. 5 shows a center-tapped secondary circuit which can be used with the driver circuits of the present invention. The half-wave and center-tapped secondary circuits of FIGS. 4 and 5 can be used with the driver circuits 26a 26b illustrated in FIG. 1, or any other driver circuits disclosed herein.

Figure 6:
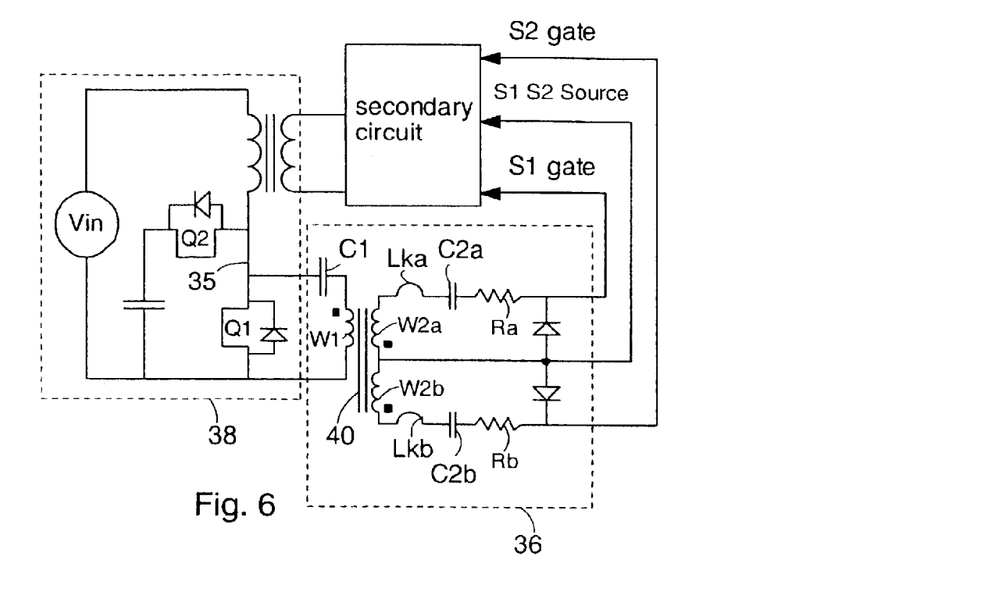
FIG. 6 shows a power converter with an active clamp forward primary circuit in combination with a driver circuit according to the present invention.

The driver circuits of the present invention can also be used with many different kinds of primary circuits. FIG. 6, for example shows a driver circuit 36 according to the present invention combined with an active clamp forward primary circuit 38. Driver circuit 36 is connected to swing node 35 through primary capacitor C1. In this embodiment, the drive transformer 40 has a single primary winding W1 coupled to two secondary windings W2a W2b. Drive circuit 36 provides gate drive signals for both S1 and S2. The gate drive signals for S1 and S2 have opposite polarities, as evidenced by the polarity markings (small squares) adjacent to the drive transformer 40 windings. The secondary circuit can be the current doubler of FIG. 1, the half-wave of FIG. 4, or the center-tapped of FIG. 5. The operation principle of the circuit of FIG. 6 is the same as for FIG. 1.

Figure 7:
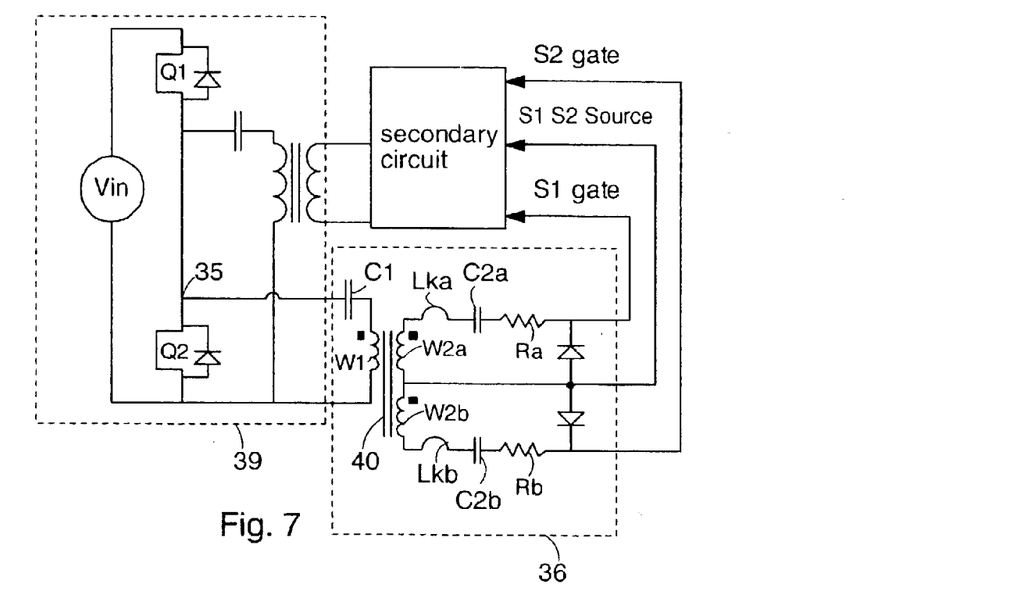
FIG. 7 shows a power converter with an asymmetrical half bridge primary circuit in combination with a driver circuit according to the present invention.

FIG. 7 shows an asymmetrical half bridge primary circuit 39 in combination with the driver circuit 36 of the present invention. Driver circuit 36 is connected to swing node 35 through primary capacitor C1. In FIG. 7, the polarity of the windings of the transformer 40 are reversed compared to the circuit of FIG. 6.

In view of the foregoing, there are at least 9 possible combinations of primary circuits (full bridge, active clamp forward, and asymmetric half bridge) and secondary circuits (half wave, center tapped, and current doubler) contemplated in the invention.

Figure 8:
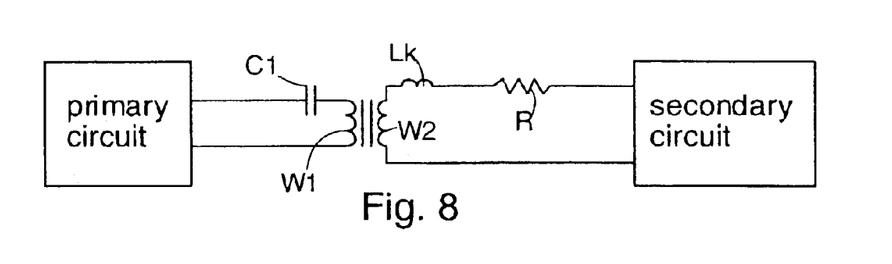
FIGS. 8–11 show alternative drive circuits according to the present invention.

The driver circuit according to the present invention can be modified in many ways. FIG. 8, for example, shows a driver circuit according to the present invention that does not have a clamping diode or a secondary capacitor. The driver circuit of FIG. 8 has only a damping resistor R in series with the secondary winding W2. In fact, the damping resistor R can be eliminated if the secondary winding W2 or other circuit components in series provide enough resistance. However, primary capacitor C1 is necessary in the invention.

Figure 9:
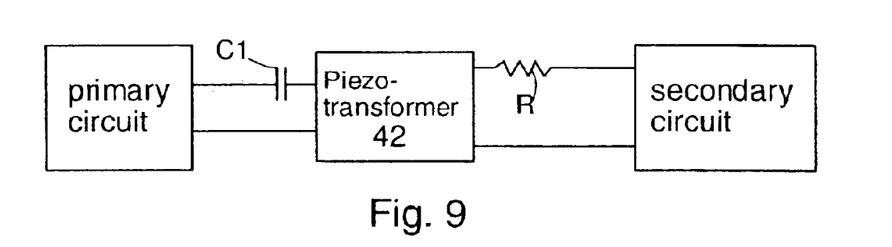

FIG. 9 illustrates another embodiment of the invention where the drive transformer is replaced with a piezo-transformer 42. The piezo-transformer 42 is an isolation device that provides isolation in the same manner as the drive transformer. It is noted that the primary capacitor C1 is needed if the piezotransformer is used.

Figure 10:
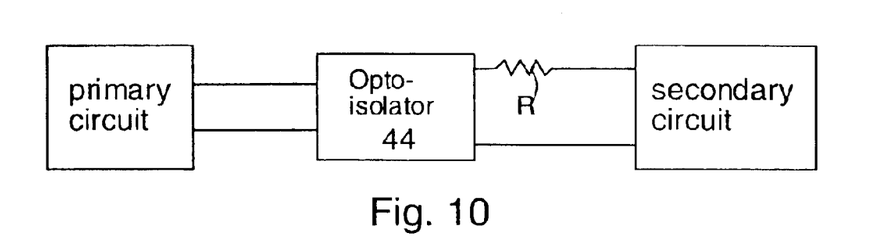

FIG. 10 illustrates another embodiment of the invention where the drive transformer is replaced with an opto-isolator 44. The opto-isolator 44 is an isolation device that provides isolation in the same manner as the drive transformer. It is noted that the primary capacitor C1 is not needed if the optoisolator is used.

Figure 11:
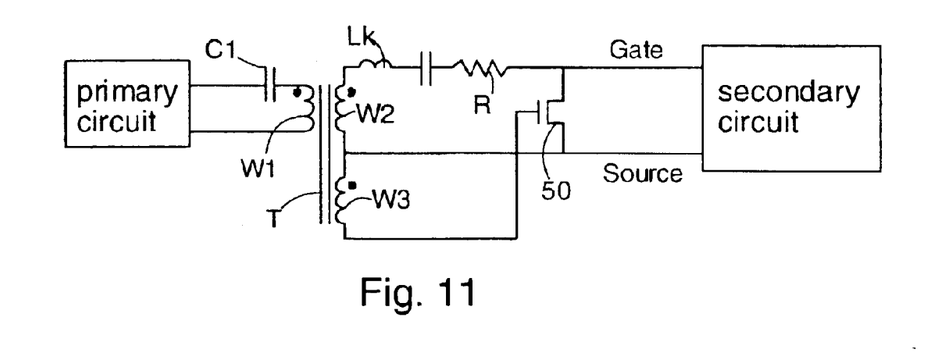

FIG. 11 illustrates an alternative embodiment having a driver switch 50 (e.g. MOSFET) connected across the driver circuit. The driver switch 50 is controlled by a trigger winding W3 of the drive transformer T. Driver switch 50 is connected across the Gate and Source connections of switches in the secondary circuit, as illustrated. The embodiment of FIG. 11 provides a fast transient response compared to driver circuits without a driver switch 50 and trigger winding W3. This tends to reduce dead time duration, and hence, body diode conduction losses.

Figure 12:
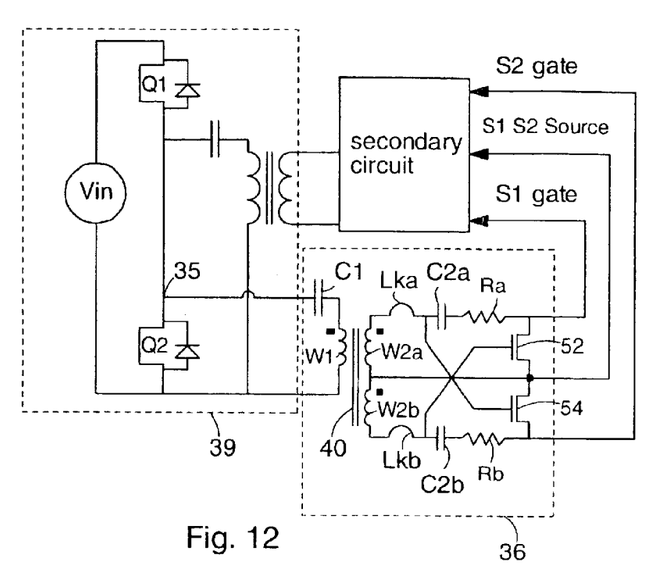
FIG. 12 shows an alternative driver circuit that has two driver switches for driving the secondary switches.

FIG. 12 shows yet another embodiment where the driver circuit 36 has two driver switches 52 54 connected in a cross-coupled fashion for driving the secondary switches. The driver switches can be MOSFETs or other field-effect transistors. Secondary switch S1 turns ON when driver switch S2 turns OFF; Secondary switch S2 turns ON when driver switch 54 turns OFF. Also, secondary switches S1 and S2 are turned OFF faster due to the drive switches, which discharge gate capacitances of S1 and S2 very rapidly. Fast turnoff of S1 and S2 provides shorter deadtime, and hence reduced power loss. It is noted that the driver circuit of FIG. 12 can also be used with the active clamp forward circuit of FIG. 6, and any of the secondary circuits disclosed herein. The driver circuit of FIG. 12 cannot be used with the full bridge primary circuit of FIG. 1.

The driver circuits of FIGS. 8–11 can be used with any of the primary and secondary circuits disclosed herein.

Finally, it is noted that the present invention can be used with soft switching or hard switching. Zero-voltage switching (ZVS) control of the primary circuit is preferred because it provides reduced power loss, as known in the art. Particularly, complementary control (a kind of ZVS) can be used with any of the primary circuits disclosed herein. Other kinds of ZVS that can be used in combination with the invention include phase shift control and active clamp control.

It is noted that the secondary circuits can have more than two switches. For example, the secondary circuits can include several rectifying circuits connected in parallel and operated synchronously.

It will be clear to one skilled in the art that the above embodiment may be altered in many ways without departing from the scope of the invention. Accordingly, the scope of the invention should be determined by the following claims and their legal equivalents.

What is claimed is:

1. A power converter having a primary circuit and a secondary circuit coupled through a power transformer, comprising:
   a) a swing node in the primary circuit;
   b) a driver circuit connected to the swing node, wherein the driver circuit includes at least one drive transformer providing isolation between the primary circuit and secondary circuit, wherein the at least one drive transformer is separate from the power transformer; and
   c) at least two rectifying secondary switches in the secondary circuit controlled by the driver circuit, wherein the at least one drive transformer has one secondary winding for driving each secondary switch.

2. The power converter of claim 1 wherein the primary circuit is selected from the group consisting of a full bridge circuit, an active clamp forward circuit, and an asymmetrical half bridge circuit.

3. The power converter of claim 1 wherein the secondary circuit is selected from the group consisting of a half-wave circuit, a center-tapped circuit, and a current-doubler circuit.

4. The power converter of claim 1 wherein the driver circuit includes a damping resistor.

5. The power converter of claim 4 wherein the damping resistor has a resistance of less than 10 Ohms.

6. The power converter of claim 1 further comprising a primary capacitor connected between the drive transformer and the swing node.

7. The power converter of claim 1 wherein the drive transformer has a leakage inductance less than 10 nanohenries.

8. The power converter of claim 1 wherein the drive transformer has a single primary winding coupled to two secondary windings, and each secondary winding provides gate drive for a switch in the secondary circuit.

9. The power converter of claim 8 further comprising two drive switches connected in a cross-coupled fashion for controlling the secondary side switches.

10. The power converter of claim 1 wherein the secondary circuit has two secondary switches, and each of the two switches is controlled by a separate driver circuit.

11. The power converter of claim 1 wherein the driver circuit includes a clamping diode.

12. The power converter of claim 1 wherein the drive transformer is a piezotransformer, and wherein the piezotransformer is connected to the swing node through a primary capacitor.

13. The power converter of claim 1 wherein the drive transformer has a trigger winding, and the driver circuit includes a switch with a gate connected to the trigger winding, and the switch is connected across a secondary winding.

14. The power converter of claim 1 further comprising a means for controlling the primary circuit according to a control scheme that provides zero-voltage switching.

15. A power converter having a primary circuit and a secondary circuit coupled through a power transformer, comprising:
   a) a swing node in the primary circuit;
   b) a driver circuit connected to the swing node, wherein the driver circuit includes:
      a drive transformer providing isolation between the primary circuit and secondary circuit, wherein the drive transformer is separate from the transformer;
      a primary capacitor connected between the swing node and the drive transformer;
   c) at least two rectifying secondary switches in the secondary circuit controlled by the driver circuit, wherein the at least one drive transformer has one secondary winding for driving each secondary switch; and
   d) a damping resistor connected between the drive transformer and each secondary switch.

16. The power converter of claim 15 wherein the driver circuit includes a damping resistor.

17. The power converter of claim 15 wherein the damping resistor has a resistance of less than 5 Ohms.

18. The power converter of claim 15 wherein the drive transformer has a leakage inductance less than 5 nanoHenries.

19. The power converter of claim 15 wherein the drive transformer has a single primary winding coupled to two secondary windings, and each secondary winding provides gate drive for a secondary switch in the secondary circuit.

20. The power converter of claim 18 further comprising two drive switches connected in a cross-coupled fashion for controlling the secondary side switches.

21. The power converter of claim 15 wherein the secondary circuit has two secondary switches, and each of the two switches is controlled by a separate driver circuit.

22. The power converter of claim 15 further comprising a means for controlling the primary circuit according to a control scheme that provides zero-voltage switching.

23. The power converter of claim 15 wherein the drive transformer has a trigger winding, and the driver circuit includes a switch with a gate connected to the trigger winding, and the switch is connected across a secondary winding.

24. A power converter having a primary circuit and a secondary circuit coupled through a power transformer, comprising:
   a) a swing node in the primary circuit;
   b) a driver circuit connected to the swing node, wherein the driver circuit includes an optoisolator providing isolation between the primary circuit and secondary circuit; and
   c) at least two rectifying secondary switches in the secondary circuit controlled by the driver circuit, wherein the optoisolator directly powers gates of the secondary switches.

* * * * *